United States Patent
Mosquera et al.

(10) Patent No.: US 6,505,202 B1
(45) Date of Patent: Jan. 7, 2003

(54) APPARATUS AND METHODS FOR FINDING INFORMATION THAT SATISFIES A PROFILE AND PRODUCING OUTPUT THEREFROM

(76) Inventors: Linda Allan Mosquera, 185 Florence Rd., Waltham, MA (US) 02453; Duane Steward, 27 Pond View Rd. #1, Arlington, MA (US) 02474; Brian C. Clark, 14 Hartwell St., Waltham, MA (US) 02453; Paul Stansbury, 34 Royal La., Londonberry, MA (US) 03053

(*) Notice: Subject to any disclaimer, the term of this patent is extended or adjusted under 35 U.S.C. 154(b) by 0 days.

(21) Appl. No.: 09/368,438

(22) Filed: Aug. 4, 1999

Related U.S. Application Data

(60) Provisional application No. 60/095,925, filed on Aug. 4, 1998.

(51) Int. Cl.[7] .............................. G06F 17/30; G06F 7/00
(52) U.S. Cl. .............................. 707/10; 707/5; 707/100; 706/55
(58) Field of Search .......................... 707/1–5, 10, 100; 706/55

(56) References Cited

U.S. PATENT DOCUMENTS

| | | | | |
|---|---|---|---|---|
| 5,321,833 A | * | 6/1994 | Chang et al. ................... | 707/5 |
| 5,717,923 A | * | 2/1998 | Dedrick et al. ............. | 707/102 |
| 5,724,567 A | * | 3/1998 | Rose et al. ...................... | 707/2 |
| 5,754,938 A | * | 5/1998 | Herz et al. .................... | 455/4.2 |
| 5,754,939 A | * | 5/1998 | Herz et al. .................... | 455/4.2 |
| 5,835,087 A | * | 11/1998 | Herz et al. ................... | 345/327 |
| 5,878,406 A | * | 3/1999 | Noyes .......................... | 706/55 |
| 5,941,978 A | * | 8/1999 | Finni ........................... | 712/28 |
| 6,029,195 A | * | 2/2000 | Herz .......................... | 709/219 |
| 6,052,122 A | * | 4/2000 | Sutcliffe et al. ............. | 345/331 |
| 6,055,542 A | * | 4/2000 | Nielsen et al. ............... | 707/104 |
| 6,085,190 A | * | 7/2000 | Sakata ........................... | 707/6 |
| 6,119,164 A | * | 9/2000 | Basche ........................ | 709/229 |
| 6,182,068 B1 | * | 1/2001 | Culliss ........................... | 707/5 |
| 6,195,657 B1 | * | 2/2001 | Rucker et al. .................. | 707/5 |
| 6,216,133 B1 | * | 4/2001 | Masthoff ..................... | 707/104 |

* cited by examiner

Primary Examiner—Jean R. Homere
Assistant Examiner—Luke S Wassum
(74) Attorney, Agent, or Firm—Gordon E. Nelson

(57) ABSTRACT

A system for evaluating information. The system defines a set of properties and one or more values for each property and then assigns property-value combinations to items of information and to profiles. Information is then evaluated by determining how the property-value combinations assigned to the items of information match those assigned to a profile. Assignments of property-value combinations have ratings and validities associated with them. In assignments to information items, the rating represents the relevance of the information item to the property-value pair; in assignments to profiles, it represents the relevance of the property-value pair to the profile. The validity for an assignment indicates a judgment concerning the strength of the assignment. The system further defines relationships between property-value combinations. When a property-value combination in a relationship is assigned, so are the related property-value combinations. One application for the system is in producing output that is personalized for a recipient. The recipient is represented by a profile. The output is a hierarchy of information items, and in making the output the system chooses among alternatives on the basis of the property-value assignments to the information items and the recipient's profile. Choice of components begins at the bottom of the hierarchy, with the scores of choices at lower levels affecting the choices at higher levels. Another use of the system is in evaluating feedback information items received from the recipient. Also disclosed are graphical user interfaces for defining properties and values and assigning properties and values to information items and profiles.

10 Claims, 16 Drawing Sheets

Strategic Presentation Builder

Profile the audience for your presentation:

Company Name: Mercy Hospital   1305
Market Niche: Emergency   1307
Presentation Length: 30 Minutes   1309

Audience
Executive        Clinical   1311    Biomedical

Product
☐ Omnicare 24    ☐ I-Stat     1305
☑ LabVue         ☐ PalmVue

[?]  Cancel   <Back   Next>   Finish

| Property | Values | Rating |
|---|---|---|
| Audience | Executive | High |
| Geography | Latin America | High |
| Needs | Remote Access | High |
| | Easy Configuration | Medium |

Recipient profile 1501

| # in group | Property | Value | Rating | |
|---|---|---|---|---|
| 1 | Audience | Executive | High (40) | 1505 |
| 2 | Audience | Admin | Low (20) | 1507 |
| 3 | Default | N/A | Low (20) | 1509 |

Heading Interchangeable Part Group 1703: group type: fixed length, always 1

| # in group | Property | Value | Rating | Total | Priority | |
|---|---|---|---|---|---|---|
| 1 | Geography | Latin America | High (40) | 40 | | 1513 |
| 2 | Audience<br>Needs | Executive<br>Easy Config. | Medium (30)<br>High (40) | 70 | 3 | 1515 |
| 3 | Geography | Latin America | High (40) | 40 | | 1517 |
| 4 | Geography<br>Audience | Latin America<br>Executive | High (40)<br>High (40) | 80 | 1 | 1519 |
| 5 | Needs<br>Audience | Remote Access<br>Executive | High (40)<br>High (40) | 80 | 2 | 1521 |
| 6 | Audience | Executive<br>Admin | Never (10)<br>High (40) | 50 | | 1523 |

Bulleted List Interchangeable Part Group 1511: Fixed Length, always 1

Fig. 15

APPARATUS AND METHODS FOR FINDING INFORMATION THAT SATISFIES A PROFILE AND PRODUCING OUTPUT THEREFROM

CROSS REFERENCES TO RELATED APPLICATIONS

The present patent application claims priority from the provisional patent application U.S. S No. 60/095,925, Mosquera, et al., Dynamic information delivery system, filed Aug. 4, 1998.

BACKGROUND OF THE INVENTION

1. Field of the Invention

The invention concerns creation and delivery of information generally and more particularly concerns systems which evaluate information in order to deliver output in which the information is tailored to the recipient or to analyze the information for a user-defined purpose.

2. Description of the Prior Art: FIG. 1

A common use of computers has been to personalize information that is provided to a recipient. One example of such personalization is personalized form letters: a form letter which in the days before computers would have begun "Dear Sir or Madam" now begins with the name of the recipient. Another example is personalized story books for children: the maker of the book is given the name of the child for whom the book is intended and the child appears as a character in the story. More sophisticated examples include commercial Web sites which keep track of a shopper's past and current shopping behavior and use that information to determine what other products the shopper might be interested in and to produce output to the shopper which calls the shopper's attention to those products.

FIG. 1 is a high-level block diagram of a system 101 that uses information 109 about a recipient of personalized information and information items 107 from an information item database 105 to produce personalized output information 111. The behavior of system 101 is determined by information assembly program 103, which uses recipient info 109 to determine which of the items in info item database should be included in personalized output info 111 and then makes personalized output info 111 using the selected information items 107. Examples of systems like system 101 include the mail merge programs that are used in word processing systems to produce personalized form letters and the components of Web servers which select what is to be output to the client on the basis of information about the client which is available to the server.

As any recipient of junk mail or Web shopper knows, the prior-art systems for producing personalized output information are effective and useful; they do, however, have a number of limitations:

information assembly program 103 is specific to a particular task of assembling personalized output information instead of general;

one consequence of this fact is that systems 101 of any complexity at all must be designed, built, maintained, and modified by programmers or highly-specialized content developers.

The need for programmers to build and maintain such systems means that they are expensive and inflexible and subject to all of the problems that arise when a system that is intended to meet the needs of subject-matter specialists such as salespeople is built by technical specialists who have no experience in the subject matter domain in which the system is to operate. One consequence of this fact is that systems 101 of any complexity at all must be designed, built, maintained, and modified by programmers or highly specialized content developers.

The need for programmers to build and maintain such systems means that they are expensive and inflexible and subject to all of the problems that arise when a system that is intended to meet the needs of subject-matter specialists such as salespeople is built by technical specialists who have no experience in the subject matter domain in which the system is to operate.

Systems 101 are not set up to run generically in any information environment such as word processing, presentation, html, etc.

What is needed, therefore, is techniques for making systems 101 which make it possible for people who are neither programmers nor specialized content developers to make and modify such systems as easily as they presently make and modify documents or presentations. It is an object of the present invention to provide such techniques and thereby to greatly increase the utility of systems 101.

SUMMARY OF THE INVENTION

The object of the invention is attained in a system in which a non-programmer defines properties and values for the properties which are relevant to the information being evaluated to produce the output. The non-programmer then assigns properties and values to the items of information from which the output is to be selected as is required by the content of the items of information and also assigns properties and values to a profile that describes the recipient of the output. The system then filters the information items to produce the personalized output. The filtering is done by excluding information items when none of the properties and values assigned to an information item matches a property and value assigned to the profile. Selection from among information items which have properties and values that do match those of the profile is done using ratings and validities in the assignments to the profile and the information items. The ratings in assignments to information items express the relevance of the information item to the assigned property and value; the ratings in assignments to profiles express the relevance of the property and value to the profile. A validity expresses the strength of the non-programmer's presumption concerning the correctness of the assignment to which the validity belongs. The ratings and validities are used to produce scores for information items, and the system uses the scores to select the information items.

Assignment of properties and values is made easier by means of relationship definitions. A relationship definition establishes a relationship between an origin property and value and a destination property and value. When the system assigns the origin property and value, it also assigns the destination property and value. The relationship definition has a validity which defines the strength of the presumption that the assignment produced by the relationship is valid.

Items of information in the system are hierarchically ordered; evaluation of items of information begins at the bottom of the hierarchy, with the scores of items at lower levels of the hierarchy helping to determine the scores of items at higher levels of the hierarchy. Moreover, scores at each level may be used to determine what information items are included at that level.

The graphical user interface for the system includes windows which permit the non-programmer to see what choices of information items are available and the properties and values assigned to those information items and an interface which automates assignment of properties and values to information items as the information items are being edited. The latter interface works by having the non-programmer define an editing profile and indicating to the system that the properties and values specified in the editing profile be assigned to the information items currently being edited.

In another aspect, the invention is used with Web pages. The pages and their components are assigned properties and values as described above, and a profile of the current recipient of the Web pages determines what pages and components are selected for output. The system automatically alters the profile in response to feedback from the recipient, and the system also automatically saves feedback as information items. Profiles may then be used to select feedback for analysis as described above.

Other objects and advantages will be apparent to those skilled in the arts to which the invention pertains upon perusal of the following Detailed Description and drawing, wherein:

BRIEF DESCRIPTION OF THE DRAWING

FIG. 13 is a screen used to define a recipient profile;

FIG. 15 is an example of scoring in a preferred embodiment; and.

Figure 1:
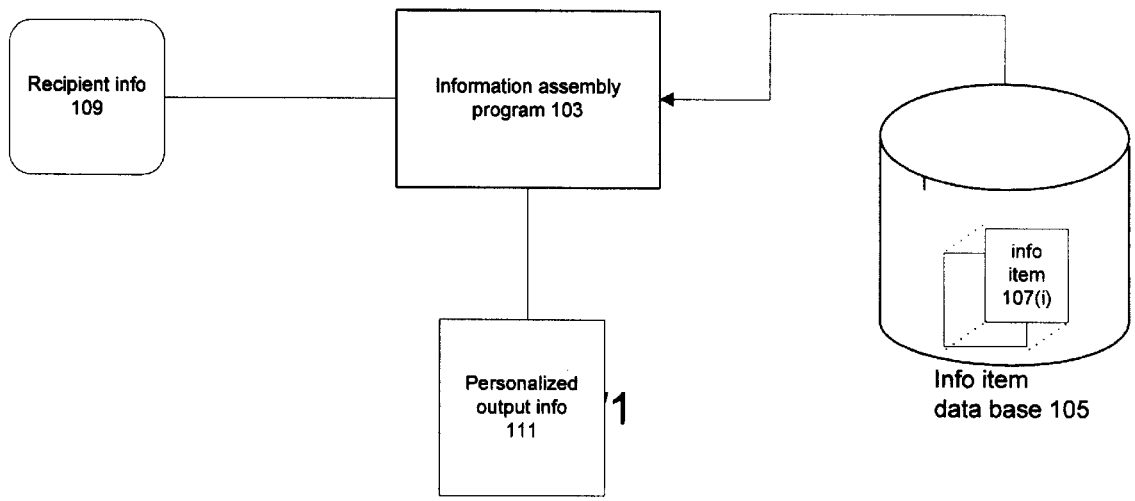
FIG. 1 is a block diagram of a prior-art system for producing personalized output information.

Reference numbers in the drawing have three or more digits: the two right-hand digits are reference numbers in the drawing indicated by the remaining digits. Thus, an item with the reference number 203 first appears as item 203 in FIG. 2.

DETAILED DESCRIPTION

Figure 2:
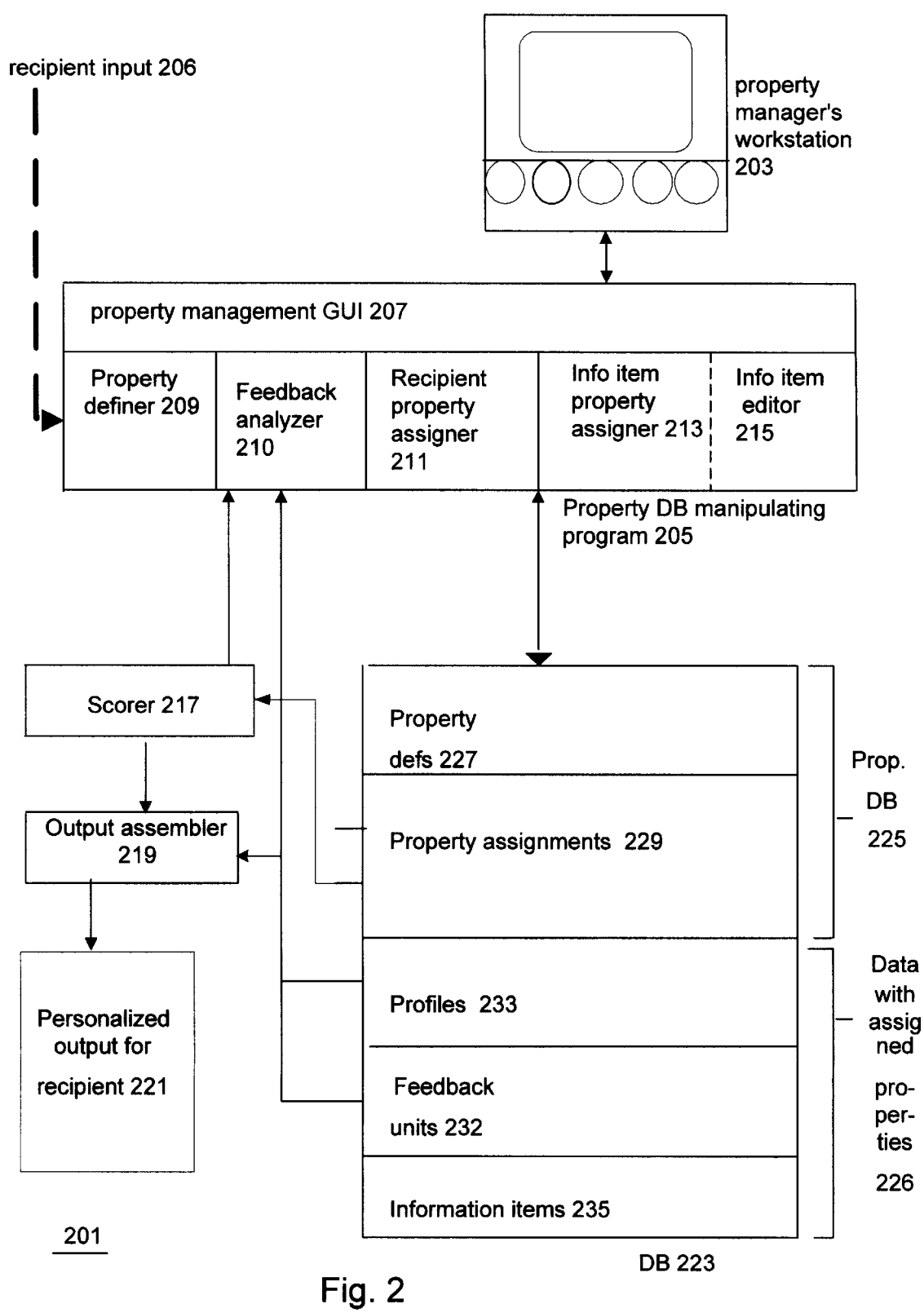
FIG. 2 is a block diagram of the system for producing personalized output of the invention.

FIG. 2 shows a system 201 for outputting personalized information to a recipient which can be maintained and modified by non-programmers. This is done by providing the non-programmers with mechanisms for defining properties and values for those properties that describe the kind of information that is to be output to the recipient. After defining the properties and values, the non-programmer (termed herein the property manager) uses the provided mechanisms to make a recipient profile, that is, to assign properties and values describing the information the recipient needs to the recipient, and to assign properties and values describing the information itself to the information. The personalized output is then produced by selecting information whose assigned properties and values match those in the recipient profile and providing that information to the recipient.

The properties and values defined in system 201 may be modified at any time, as may be the assignments of properties and values to information. Of particular importance in system 201 is that information obtained by feedback from the recipient may be involved in the process of assigning properties and values. Feedback is used to modify the recipient profile for a recipient as system 201 learns more about the recipient and the feedback may also become part of the information manipulated by system 201. When the feedback is used in the latter fashion, it is assigned properties and values as it is received, and these properties and values are used together with an analysis profile of properties and values to analyze the results of the interaction between system 201 the recipients of information from it. It should further be pointed out here that defining properties and values and then assigning them to information and to profiles is a technique which is applicable in any situation where there is a need to dynamically and flexibly categorize and analyze information.

Continuing in more detail, the main components of system 201 are database 223, property database manipulating program 205, scorer 217, and output assembler 219. Database 223 has two major components: properties database 225 and data with assigned properties 226. Properties database 226 contains definitions of properties and values 227 and assignments of those properties and values to data. In a preferred embodiment, there are three kinds of data: information items 235, which is the data that is used to produce personalized output for a recipient, feedback units 232, which is data that is received in response to output of information items to a recipient, and profiles 233. The properties and values which are assigned to profiles 233 are used to evaluate information items 235 and/or feedback units 232. For example, a recipient of personalized output is associated with a profile 233, and the properties and values in that recipient profile determine which information items system 201 will output for the recipient.

The personalized output is produced by scorer 217 and output assembler 219. Scorer 217 ranks information items 235 according to how well the properties and values assigned to the information items match the recipient's profile and output assembler 219 uses the ranking by scorer 217 together with parameters such as the desired length of the output 223 to produce personalized output for recipient 221. Personalized output 221 may be any kind of output that is useful to the recipient, including a document that will be mailed or emailed to the recipient, a presentation that will made to the recipient by a salesperson or teacher, or a sequence of Web pages.

Continuing in more detail about properties and values, a property may be any factor which the property manager considers to be important for selecting which content is to be used. For example, one such factor might be the area of the world in which the customer is located. The property manager might give such a property the name GeographicalArea. The property manager then defines a set of values for the property. For GeographicalArea, the values might represent those areas of the world in which the recipients of the personalized information live. Values might be, for instance, UnitedStates, LatinAmerica, Japan, WesternEurope, and so forth. As can be seen from the foregoing, definition of properties and their sets of values is completely arbitrary. The property manager may further define priorities for the values relative to each other.

To determine what information items will be output to what recipients, the user of system 201 assigns properties and values to recipients and information items. For example, if a the geographical area in which recipient John Doe lives is important for the personalization of the information directed to him, the GeographicalArea property will be assigned to him, and if John Doe lives in Great Britain, the WesternEurope value for that property will be assigned to him. Similarly, if an item of information is suitable for some geographic areas but not others, the user of system 201 will assign the GeographicalArea property to the item of information and will further assign the values that indicate the geographical areas for which the item of information is suitable to the property. For instance, if an item of information is relevant only to recipients who are residents of countries belonging to the European Common Market, the GeographicalArea property would have only the value WesternEurope assigned to it.

When a property-value combination is assigned to an information item or profile, the property-value combination is given a rating for that assignment. In the case of information items, the rating indicates the relevance of the information item to the property-value combination. The higher the rating, the more likely the scorer is to select the item when the recipient's profile indicates that property-value combination. In the case of profiles, the rating indicates the relevance of the property-value combination to the profile. Additionally, the property-value combination may be given a validity for the assignment; the validity indicates a probability that the assignment is correct.

Scorer 217 works as follows:
First, it rejects information items where there is no match between the property-value combinations assigned to the information item and the property-value combinations assigned to the recipient's profile;
Then, for each information item where there is a match, the scorer uses the ratings and validities for the property-value combinations of the information item that match those of the profile to produce a score for the information item. The score measures the relevance of the information item to the recipient's profile.
Then the members are ranked according to their scores. Output assembler 219 then selects information items, beginning with those that have the best scores, until it has what it needs for output 221. Where there are ties among information items, the priorities for the properties' values are used to break the ties. Selection by output assembler 219 is further governed by considerations such as the desired length of the presentation. As will be explained in more detail later, selection is also governed by the type of the information item: some information items may not be cut from output for which they match the profile and the order of information items may also be fixed.

The technique of expressing relationships between information items and recipients by assigning properties, values, and ratings to both the information items and the recipient profile and then determining the "fit" between an information item and a recipient by determining whether there is a match between the property-value combinations assigned to the profile and those assigned to the information item and then using the ratings of the matching combinations assigned to the information item to score the information item has a number of advantages:

Properties and their values may be anything that a property manager 201 considers to be useful in selecting information items for output to a recipient. Properties can be defined by anyone. All the definer need do is give the property a name and define a range of values for it;

Ratings give a property manager a way of quantifying the relevance of an information item to a property-value combination or the relevance of a property-value combination to a profile;

Validities provide a way of indicating the property manager's confidence in the assignment of a property-value combination to an information item or profile;

The property manager may define and redefine properties and values at any time and may assign property-value combinations and ratings to data at any time;

Since substantially any number of different properties may be assigned to an information item, profile, or feedback unit, each of these properties may have any value in the range defined for the property and any rating possible for the value, it is possible to easily express complex relationships between profiles, feedback units, and information items;

The use of scoring done at the time the feedback units or information items are matched with a profile completely decouples the assignment of properties, values, and ratings to profiles from the assignment of properties, values, and ratings to information items;

Because of this decoupling, feedback can be used to alter a recipient profile in response to input from the recipient;

Capturing feedback as feedback units 232 in data 226 means that the full power of analysis provided by applying profiles to information can be applied to the feedback;

The fact that the scoring ranks the information items for the recipient makes it easy to adjust the output to take other parameters such as length or bandwidth into account.

Since profiles are also data 226, it is also possible to compare profiles with profiles in system 201. For instance, the actual profiles of recipients as determined by feedback may be compared with an expected profile for them.

One area in which these advantages are particularly evident is when output personalizing program 205 is used to assemble information for output on Web pages. In such a situation, nothing is typically known about the recipient of the Web pages at the beginning of the session; however, much can be learned about the recipient from the recipient's interaction with the web pages he has already received. This input from the recipient appears as arrow 206 in FIG. 2. The input may be by way of answers to questions which the Web pages pose to the recipient, or it may be based on observations of the recipient's behavior as the recipient navigates from one Web page to another or makes transactions. Output personalizing program 205 can use recipient input 206 and feedback units 232 to determine what properties and values should be assigned to the recipient's profile in property assignments 229, and each time the properties or values assigned to the recipient's profile change, output assembler 219 can take the changes into account in determining what is to be output next to the recipient. As a result of this process, the content of the Web pages output to recipient 221 will automatically take into account what has been learned about the recipient in the course of the session.

The remaining components of property DB manipulating program 205 permit the property manager to define properties and values (component 209), assign properties and their values to recipients (component 211), assign properties and their values to information items (component 213), and determine from feedback units 232 whether the properties, values, and assignments in property database 225 are the best ones for the actual recipients of personalized output 221 (component 210).

Info item property assigner 213 is a component of information item editor 215, which is used to edit information items 235. Thus, when a property manager is editing information items for a presentation, the property manager can assign properties and values to the information items as he or she edits them. Of course, because assignment of properties and values to information items has been decoupled from assignment of properties and values to profiles, the assignments of properties and values made to the information items during the edit will also be relevant for profiles 233 presently in data 226 and those which may be added later as well. In a preferred embodiment, a property manager may also begin with a profile, and info item editor 215 will assist the property manager in assigning profile-value combinations from the profile to the information items that the property manager is editing.

Graphical user interface 207, finally, provides interfaces to property definer 209, recipient property assigner 211, info item property assigner 213, and feedback handler 210 which permit people who are not programmers but have the domain knowledge necessary to define properties and assign them and values for them to recipients and information items to make and maintain properties database 225. In addition, recipient property assigner 211 may also use feedback units 232 to automatically assign properties and/or values to recipients in response to recipient input 206, as described above with regard to Web pages.

Figure 3:
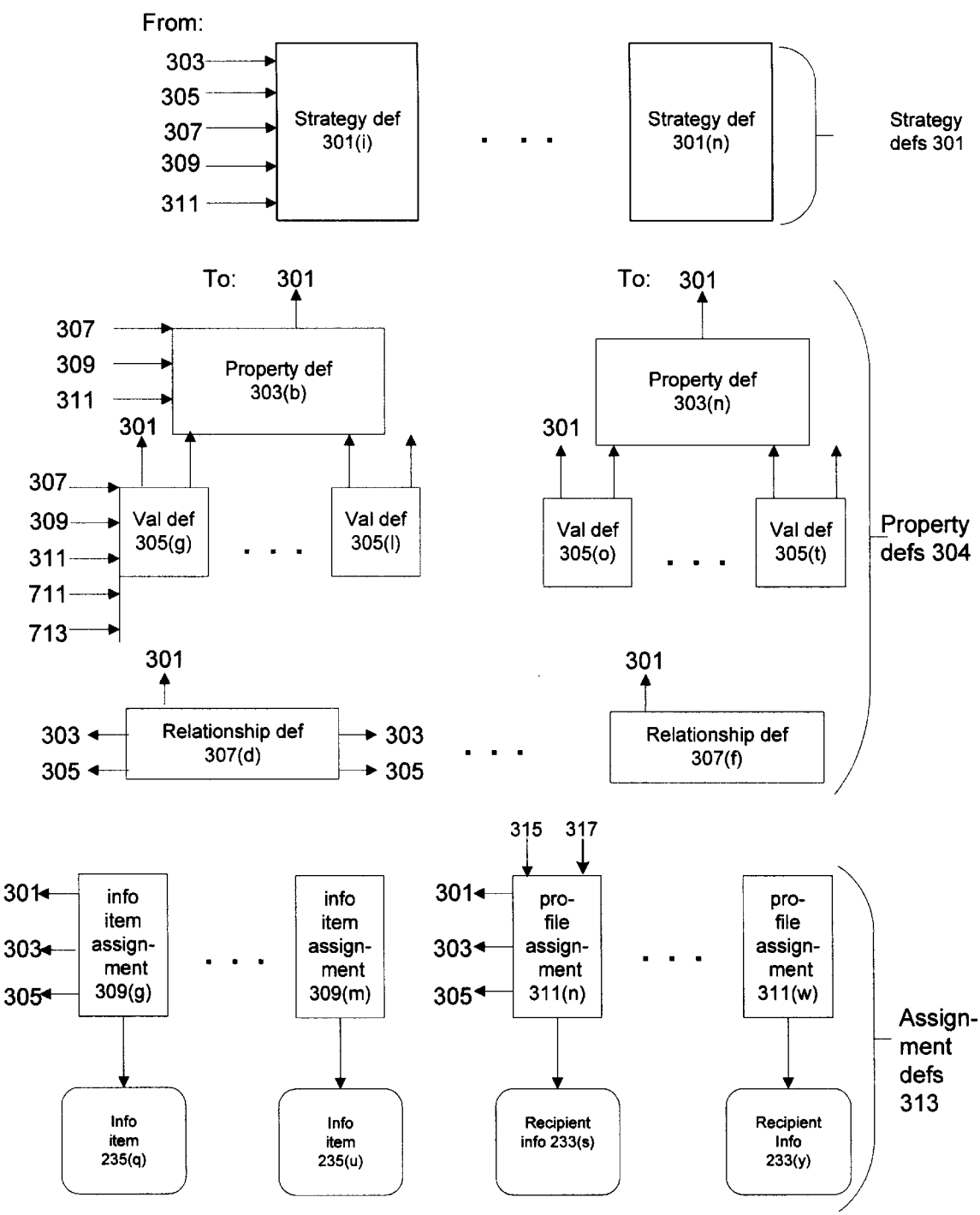
FIG. 3 is a conceptual diagram of the manner in which strategies and properties are defined and properties are assigned to information items and to recipients.

Organization of Properties and Assignments: FIG. 3

In system 201, strategies are used to organize the property definitions 227 and the property assignments 229. A strategy describes how a particular set of information items are to be used to produce output for a particular set of recipients. For example, if a user of system 201 has as his or her goal the production of sales information about a medical product, then the strategy for the medical product describes how information items describing the product are to be combined to produce sales information for possible customers for the medical product. In system 201, a strategy is defined by property definitions 227 and information item property assignments 231. A given property or information item property assignment may be used with more than one strategy. When system 201 is used to make personalized output, the user specifies the strategy and a profile for the recipient(s) to which property-value combinations belonging to the strategy have been assigned. Output assembler 219 collects information items to which properties and property values belonging to the strategy have been assigned, scorer 217 scores them, and then output assembler assembles the output information to produce personalized output 221 as determined by the scores.

FIG. 3 shows how property definitions 227 and property assignments are related to each other and to strategies in a preferred embodiment. In the case of the property definitions 227 and the property assignments 229, the property definitions and property assignments are related to the strategies when the property definitions, property assignments, or strategies are defined. In FIG. 3, if an item is referred to by another item in the figure, that is indicated by an incoming arrow with the reference number for the referring item. Thus, a strategy definition 301 is referred to by one or more property definitions 303, and therefore has an incoming arrow labeled 303. Similarly, a property definition 303 refers to at least one strategy definition 301, as indicated by the outgoing arrow labeled 301. Complete references are shown only for one definition in each set in the Figure. In the preferred embodiment, the definitions are implemented in a relational data base. The relational database has a table for each kind of definition, with each individual definition being an entry in the table for its definition and the contents of the definition being fields in the table.

Beginning with strategies, they are defined in strategy definitions 301. A strategy definition 301($n$) contains a name for the strategy, an identification number for it, and a short description of it. The definitions of all of the properties and information assignments belonging to a strategy contain the identification number for the strategy and are thereby related to it. This is shown by arrows 303, 305, 307, 309, and 311 in strategy def 301($i$). Properties are defined in property definitions 304. A property definition 303($i$) includes:

The identifiers of the strategy definitions 301 for the strategies which use the property definition;

An identifier for the property definition 303; and

A name for the property.

The values which a property may have are defined in value definitions 305. Each value definition 305 includes:

An identifier for the property definition which uses the value definition;

Identifiers for the strategy definitions which use that property definition;

An identifier for the value definition;

The value itself; and

The value's priority.

In a preferred embodiment of system 201, a user may define a relationship between an origin property and a destination property. The relationship relates a value of the origin property to one or more values of the destination property. When a property and value are assigned to an information item or to a recipient and the assigned property is an origin property in a relationship, the destination property and the values specified in the relationship are also assigned to the information item or recipient. This arrangement permits a user of system 201 to define sets of related properties and values such that an assignment of one origin property and value to an information item or recipient results in the assignment of all properties and values which are related to the origin property and which belong to the strategy to which the assignment belongs.

As shown in FIG. 3, a relationship definition 307 includes:

an identifier for the relationship definition;

an identifier for the origin property definition;

an identifier for the destination property definition;

a property-level priority for the relationship;

a property-level validity for the relationship;

an identifier for the strategy to which the relationship belongs;

an identifier for the value definition from the origin property for the relationship;

identifiers for one or more value definitions from the destination property for the relationship;

a value-level priority for the relationship; and a value-level validity for the relationship.

The validity specifiers permit definition of relationships on the basis of presumptions made by the property manager. The validity specifier indicates the strength of the property manager's belief in the presumption.

Properties and values may be assigned to profiles, feedback units, and information items. As shown in FIG. 3, assignments are defined in assignment definitions 313. Assignment definitions 309 for information items include the following:

an identifier for the assignment definition;

an identifier for the information item to which the properties and values are to be assigned;

identifiers for the property definitions 303 for properties assigned to the information item;

identifiers for the value definitions 305 for the values assigned to the information item;

identifiers for the strategies for which the assignment was made; if no strategy is specified, the assignment counts for all strategies;

a rating, which indicates the relevance of the information item for the property-value combination that has been assigned to it; and a validity rating for the assignment.

A profile assignment definition 311 includes the following:

an identifier for the profile;

if the profile is a recipient profile, an identifier for the recipient to which the profile belongs; in a preferred embodiment, the identifier identifies a record for the recipient in a contact database which may be part of database 223 or separate from it;

identifiers for properties assigned to the profile;

identifiers for values assigned to the profile; an identifier for the strategy definition upon which the information being produced for the recipient is based;

a rating, which indicates the relevance of the property-value combination to the profile it has been assigned to; and a validity rating for the assignment.

Entries in two other tables refer to profile assignment 311; in one table, identified by arrow 315 but not shown, the entries contains information about sessions that the user represented by the profile has had with system; in another, identified by arrow 317, the entries record the feedback received by the recipient represented by the profile. It will be dealt with in detail in the discussion of feedback below. As noted above, in a preferred embodiment, the strategy for a profile is temporarily assigned to the profile when the output information for the recipient to whom the profile belongs is produced.

Figure 4:
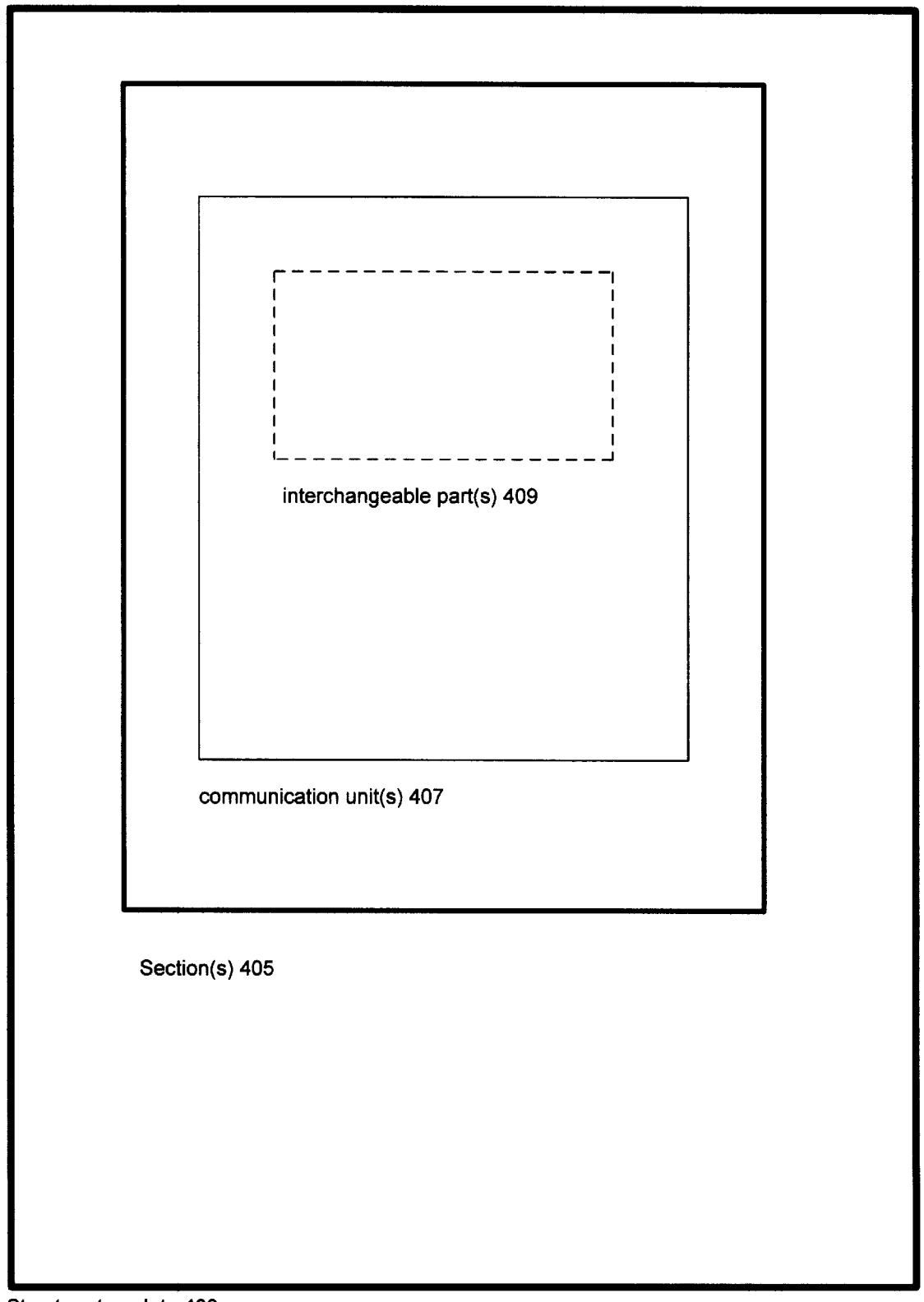
FIG. 4 is a diagram of the kinds of information items in a preferred embodiment and the manner in which they are related to each other.
Figure 5:
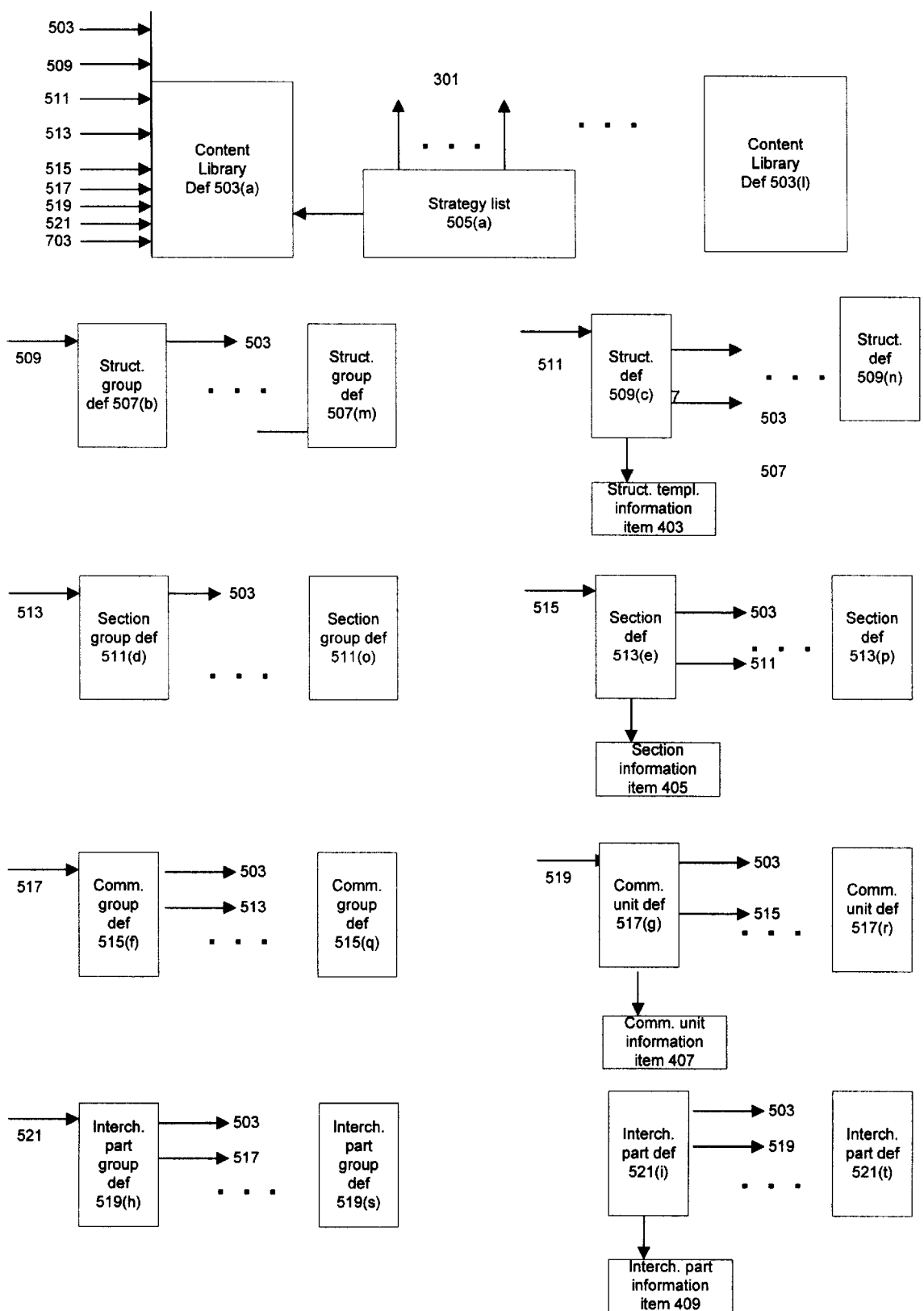
FIG. 5 is a conceptual diagram of the manner in which information items are defined in a preferred embodiment.

Organization of Information Items in a Preferred Embodiment: FIGS. 4 and 5

In a preferred embodiment, there are four classes of information items. The classes form a hierarchy. At the bottom of the hierarchy are interchangeable part information items. Interchangeable parts are relatively small. They typically appear in the output as elements of lists. Next in the hierarchy come communication unit information items. Communication units are larger and may include one or more interchangeable parts. What a communication unit appears as in the output depends on the form of the output: if the output is a document, the communication unit is a paragraph or small section; if the output is a slide presentation, the communication unit is a slide; if the output is directed to the World Wide Web, the communication unit is a web page. Next in the hierarchy is the section, which may include one or more communication units. A section corresponds to a section of a document, a sequence of related slides, or a sequence of related Web pages. The information item at the topmost level of the hierarchy is the structure template. It may include one or more sections, and corresponds to a document or file for a slide presentation or the home page for the whole sequence of Web pages output to the user.

FIG. 4 shows how these information items are combined to produce output 221 in a preferred embodiment. Output 221 consists of a structure template 403 which may contain one or more sections 405. A section 405 may contain one or more communication units 407 and a communication unit 409 may contain one or more interchangeable parts 409. Thus, in the slide presentation context, structure template 403 is the complete slide presentation; a section 405 is a section of the slide presentation; communication units 407 are the slides themselves and interchangeable parts 409 are elements within the slides.

FIG. 5 shows how information items 235 are organized in database 223 in a preferred embodiment. The figure is to be read in the same fashion as FIG. 3, and as with that figure's strategy, property, relationship, and assignment definitions, the information item definitions are entries in relational database tables. The values of fields in the entries define the information items. Properties and values may be assigned to each of the definitions in the table. In the preferred embodiment, the information items are organized into one or more content libraries. There is a content library definition 503 for each content library, and the definition of each of the information items belonging to the content library includes an identifier for the content library. Associated with each content library definition 503 is a strategy list 505, which specifies the strategies to which information items in the content library belong. The strategies are specified by means of identifiers for strategy definitions 301. Included in the content library definition are:

its identifier;

its name;

a description of the content library, an indication of the kind of content it contains (for example, web pages, slide presentations, or documents);

in the case of web pages, the virtual HOME URL for the Web pages; and the identifier of the strategy for which information items in the library are currently being scored.

Within a content library, the structure templates are organized into structure template groups. The structure templates in a structure template group are all templates for the same kind of output medium, for example, slide presentations or documents, and all of the structure templates in the group have property and value assignments which are relevant to the property and value assignments for the structure template group.

A structure group definition 507 contains the following:

an identifier for the definition 507;

identifiers for the content library definitions 503 for the content libraries the structure group belongs to;

a name for the structure group;

a type for the group which describes whether the structure templates that comprise the actual group are fixed or variable in length and fixed or variable in order;

a length for the group as in number of structure templates that comprise the assembled group;

a type for the content of the structure templates in the group; and a default structure template. This is the structure template that is used if no scoring of structure templates is done.

Continuing with structure template items 403, they are organized by means of structure template definitions 509. Each structure template definition 509 includes the following;

its own identifier;

its own name;

an identifier for the structure template information item it defines;

identifiers for the content libraries it belongs to; and identifiers for the structure groups it belongs to.

The definitions for section groups 511, for communication unit groups 515, and for interchangeable part groups 519 work in the same manner as the definitions 507 for structure template groups. The definitions for sections 513, communications units 517, and interchangeable parts 521 work the same way as structure template definition 509, except that communication unit definition 517 has a length of time or length of information (depending on the type information) field; associated with it that is used to determine and roll up the amount time or length of information an assembled group will take. It should also be mentioned here that an interchangeable part may point to a feedback unit as well as to an interchangeable part information item. Feedback units will be explained in more detail below.

Thus, all of the section definitions 513 for section information items 403 that may be used in a given structure template 507(*i*) belong to the same section group 511(*m*), and so on for communication units and communication unit groups and interchangeable parts and interchangeable part groups.

Scoring and the Hierarchy of Definitions

Each of the definitions of definitions 501 of course has one or more properties and values assigned to it. When system 201 produces output for a specified strategy and recipient, the information items that it is made up of are determined by how well the values assigned to the information items match the recipient's profile for the strategy. Scoring is done at each level of definitions 501, beginning at the bottom. The score of each higher level is computed from the score of the lower levels that it contains; the component with the highest score wins; thus, the score of a communication unit is determined using the scores of the interchangeable parts that the scorer has selected for it, the score of a section by the scores of the communication units the scorer has selected for it, and the score of a structure template by the score's of the sections the scorer has selected for it. Scoring in a preferred embodiment is dealt with in more detail below.

Details of Feedback in a Preferred Embodiment

One of the most significant characteristics of system 201 is its ability to respond to feedback from the recipient of output 221. There are two ways in which the feedback is used:

to adjust the properties and values assigned to the profile of a recipient involved in an interactive session with system 201 as the session provides information about the recipient; and to analyze the contents of database 223. Kinds of analysis include whether the assumptions underlying a strategy are true, whether recipients of output are responding in the desired fashion to it, and the relative effectiveness of information items. The analysis is done by using scorer 217 to rank values of properties or to comparing properties and values set by the feedback with expected properties and values.

There are three kinds of feedback in the preferred embodiment:

contact information feedback contains contact information for the recipient; examples are an identifier for the recipient and information about the current session with the recipient;

question feedback contains answers to questions which output 221 has posed to the recipient; the answer may have a form which is predefined by system 201 or may be freeform; and observational feedback indicates the recipient's behavior, for example the recipient's choice of a URL or selection of a product for purchase.

In a preferred embodiment, system 201 obtains predefined answers by having the recipient select options from a list.

The feedback is used as follows:

contact information feedback is used to fill in the corresponding fields in profile assignment 311 and in entries in the sessions table.

question and observational feedback is used either simply to collect information for later analysis by a property manager or to assign properties and/or values to profiles 229 and feedback units 232 in property database 225.

The assignments to profiles 229 are used to modify a recipient's profile in the course of a session; those to feedback units 232 are used to record the recipient's behavior for later use in analyzing the contents of database 223. The results of an analysis may then result in changes in database 223. The changes may be made automatically by system 201 in response to the analysis or they may be made by the property manager after the property manager has considered the analysis. In the case of freeform responses to questions, in a preferred embodiment, the responses are simply collected to be read and perhaps acted on by a property manager.

An example of the use of feedback to alter the profile of the recipient is the following: if the recipient is interacting with system 201 via the Internet, system 201 may request that the recipient indicate his or her place of residence. In response to the answer, system 201 will set the value for the GeographicalArea property in the recipient's profile to the area in which the recipient lives and from then on, the personalized output will include the information items most relevant to that area. Of course, if there are any relationships between the value received from the recipient and values of other properties, the related properties and values will be added to the recipient's profile as well.

One example of the use of feedback for analysis is this: as the recipient is interacting with system 201, the system may request that the recipient give his or her opinion of the value of the information item that the recipient has just finished dealing with. System 201 then assigns a value indicating the opinion to a feedback unit in feedback units 229. Later on, system 201 uses scorer 217 to score the information items on the basis of the value in the fashion described for scoring information items against profiles. System 201 may then automatically discard the lower-ranked information items or may report the rankings of the items via GUI 207 to a property manager for system 201, who may discard the information items or attempt to improve them.

Another example is this: system 201 may save the recipient profiles that it produced in the manner just described. A property manager may have defined an ideal profile for the recipient of personalized output made according to the strategy in the course of defining the properties and values and assigning them to information items. System 201 may then use scorer 217 to compare the profiles of actual recipients of the personalized output with the ideal profile and indicate the differences to the property manager. If the differences are substantial, the property manager may have to rethink the strategy and/or the information items that are being provided.

Figure 6:
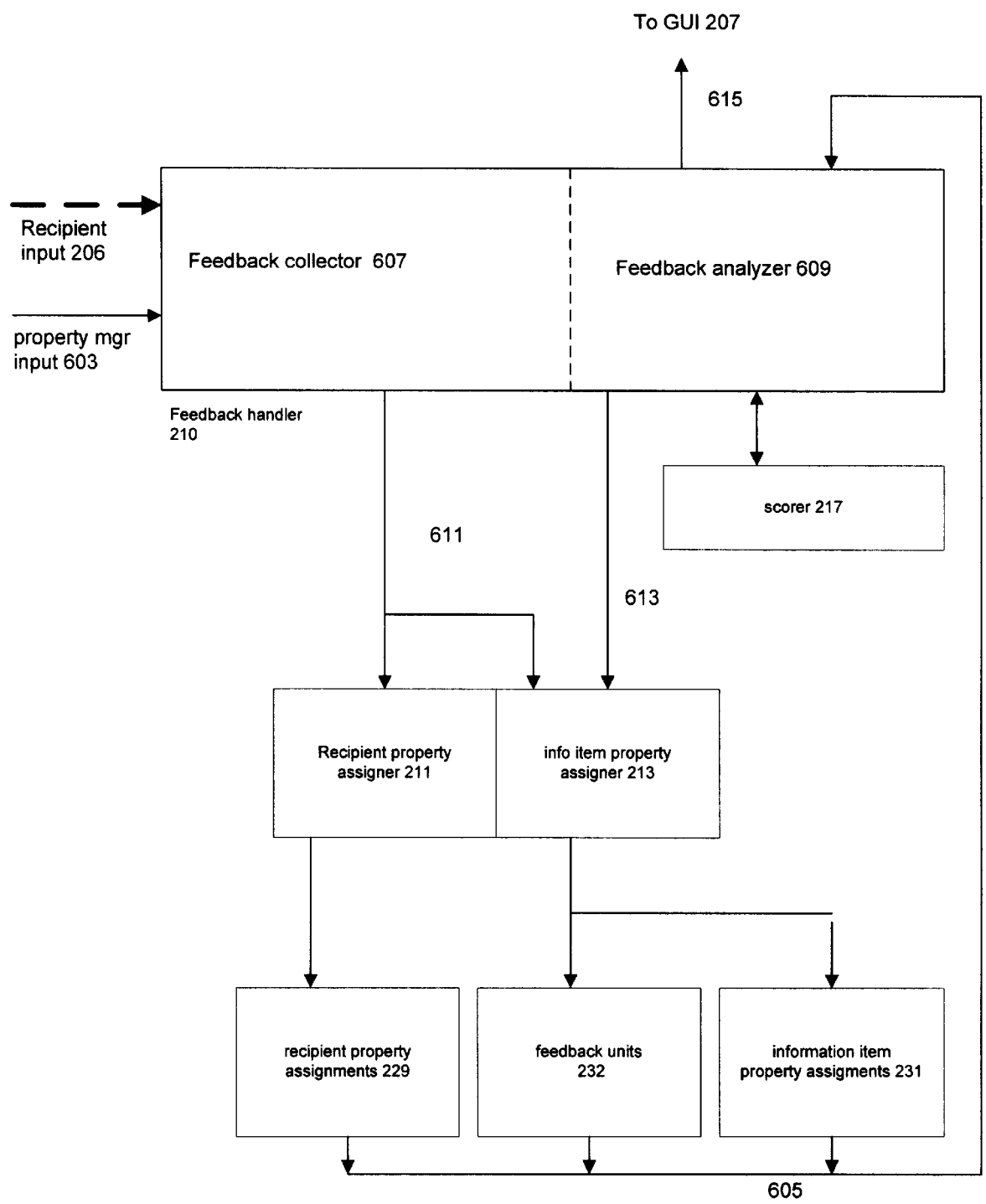
FIG. 6 is a conceptual block diagram of how feedback is processed in a preferred embodiment.

Details of Feedback Handling in System 201: FIG. 6

Feedback handling in system 201 is done using the components shown at 601 in FIG. 6. The chief component, feedback handler 210, has two subcomponents: feedback collector 607 and feedback analyzer 609. Feedback collector 607 collects feedback responses, interprets them, and depending on the response's type, makes property and/or value assignments either to the profile assignment 311 for the recipient or makes feedback units 232 for the response for use in later analysis and assigns values and properties to the feedback units.

Feedback analyzer 609 uses feedback units 232 and scorer 217 to perform analyses on items in database 223. The analysis may be either done automatically (for example, feedback analyzer may periodically analyze recipients' opinions of information items contained in feedback units 232 and a certain number of bad opinions about a given information item may result in automatic removal of the information item) or in response to input 603 from the property manager. In the latter case, the results of the analysis may be automatically applied to the database, or application of the results may be done interactively with the property manager. With freeform responses, feedback analyzer 609 can simply display the responses or email them to the responsible property manager. The kinds of analysis performed by feedback analyzer 609 are of course only limited by the capabilities of system 201. If system 201 has access to good text analysis capabilities, for example, feedback analyzer 609 can do at least a partial analysis of the freeform responses.

Both components of feedback handler 210 use recipient property assigner 211 to assign properties and values to profiles by means of profile assignment 311 and info item property assigner 213 to assign properties and values to information items by means of information item assignments 309.

Figure 7:
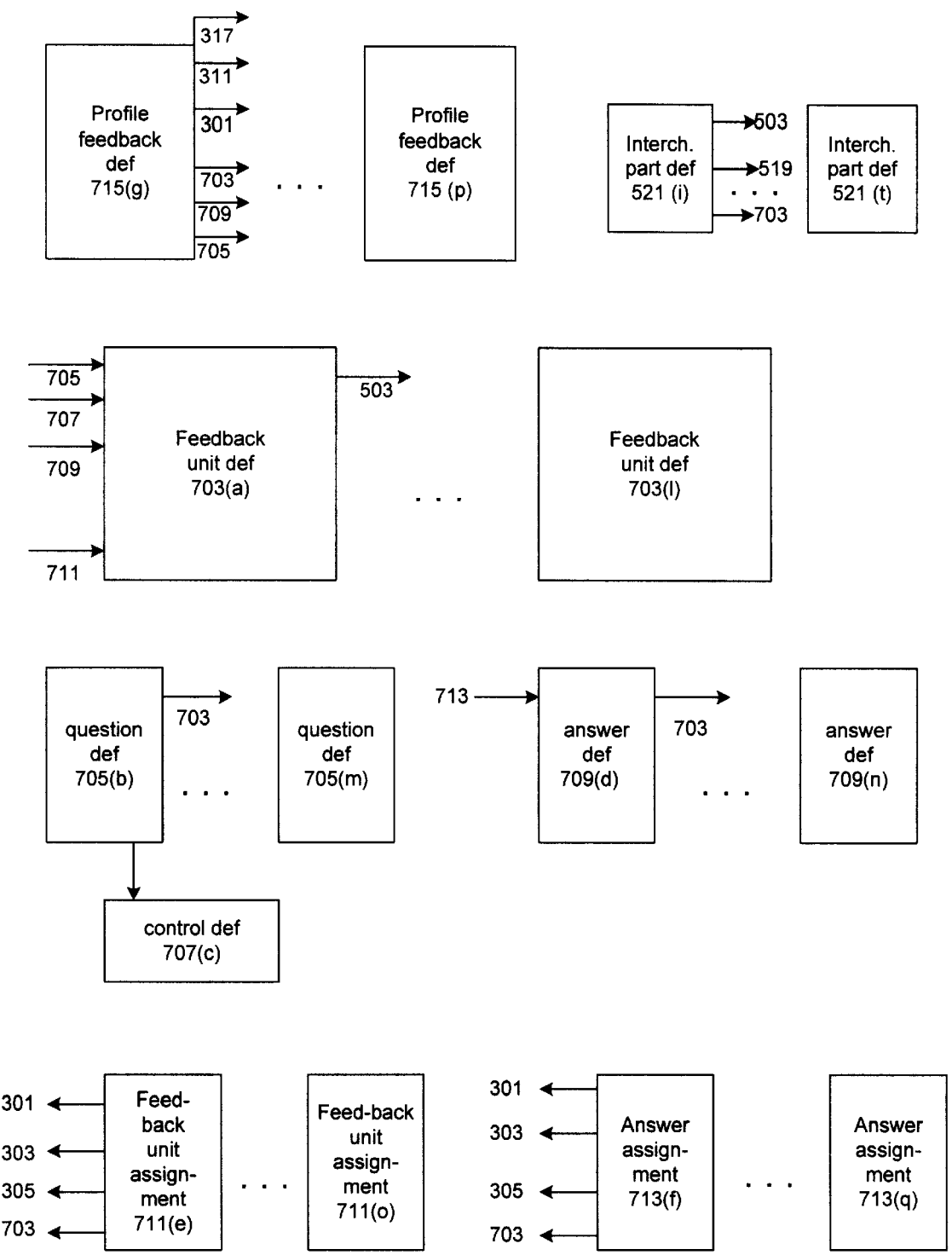
FIG. 7 is a conceptual diagram of the way in which feedback units are defined in a preferred embodiment.

Details of Feedback Units in a Preferred Embodiment: FIG. 7

FIG. 7 shows how feedback is organized in a preferred embodiment. As with FIGS. 3 and 5, the definitions shown in the figure are entries in relational database tables. In the preferred embodiment, feedback is implemented as a special kind of interchangeable part called a feedback unit. Thus, as shown in FIG. 7, each feedback unit is referred to by one or more interchangeable part definitions 521 and is related to higher-level information items in the same fashion as an interchangeable part information item 409. Feedback is further related to a profile by means of profile feedback definitions 715. A profile assignment 311 may have one or more profile feedback definitions 715 associated with it. Each profile feedback definition 715 relates a feedback unit for a session and strategy to a profile assignment 311. Fields of a profile feedback definition 715 include identifiers for the profile assignment 311, the strategy definition 301 for the strategy being employed being the session, a session entry for the session (arrow 317), and identifiers for a feedback unit definition and its components (arrows 703, 705, 709). Other fields indicate how the contents of the feedback unit definition are derived from the feedback (either directly or by some inference process) and if the feedback is freeform, a field for the freeform feedback.

A feedback unit is defined by a feedback unit definition 703 and a question definition 705 and an answer definition 709 that are related to the feedback unit definition. Property and/or value assignments may be made to feedback unit definitions 711 and to answer definitions 709. The assignments work like the assignments to profiles and information items. Continuing in more detail, a feedback unit definition is related to a content library definition 503. Fields include:

- an identifier for feedback unit definition 703;
- an identifier for the content library definition;
- an indication whether the feedback is from a question or is observational feedback;
- an indication of the usage type, i.e., whether the feedback is to be used for contact information, to dynamically define a profile, is to be used by analyzer 609, or is freeform;
- if the feedback is to be used by analyzer 609, an indication of how analyzer 609 will use it;
- whether system 201 must receive an answer to the question; and
- the default answer if no answer is required and none is received.

The question that elicits the feedback represented by feedback unit definition 703 is represented by question definition 705. As indicated by arrow 703, it is related to feedback unit definition 703. The fields of the definition are:

- the identifier of the feedback unit definition to which it belongs;
- the identifier of the question definition;
- a text string representing the question itself; and
- an identifier for a question control definition 707, which indicates what kind of list item selection mechanism was used to produce the answer.

The feedback itself is specified in feedback answer definition 709. Definition 709 has the following fields:

- the identifier of the feedback unit definition to which it belongs;
- the identifier of the answer definition;
- the answer, either text returned by the browser for questions or observational information such as the last URL selected;
- a pointer to a procedure for processing the answer to produce an assignment of a property and/or value; and
- a parameter indicating how the value is to be used in scoring.

Finally, there are the assignments used to assign the property and/or value to the feedback unit definition (711) or to the answer definition (713). Mutatis mutandis, these assignments have the same fields as the assignments 311 to profiles and 309 to information items. In general, feedback units may be regarded as a specialized kind of interchangeable part.

A property manager creates a feedback unit 703 and its question definition 705 when he or she creates a communication unit information item 407 that will use the feedback unit. For example, in the context of the Web page, the feedback unit is a portion of the Web page that poses a question to the recipient and receives the recipient's answer to the question. When the recipient's answer arrives in system 201, a copy of the portion's feedback unit for that recipient and session is made and the answer is placed in the copy's feedback unit.

/* Linda-- is this right now? /

The feedback unit remains in feedback units 232 for use in later analysis. For instance, in this case, the analysis might consist in examining the previous month's sessions for feedback about the quality of information items and determining for each item its the maximum, minimum, mode, and mean for its ratings. The results could simply be displayed to the property manager, or they could be used in an automatic process which removed the worst items from information items 235.

Details of Output Assembly in a Preferred Embodiment: FIG. 17

Assembling personalized output 221 in a preferred embodiment involves the following operations for selecting information items for personalized output 221:

Validity of Property-value Assignments

There is a distinction between intentionally assigned property-value combinations and ones that are merely assigned by implication. In a preferred embodiment, the uncertainty of implication is dealt with by means of the validity given to the property-value combination when the combination is assigned to an information item or a profile.

Selection

When information is created, the default rating that is applied to an information item in automatic parsing or in manual assignment is low. This allows for a broad pool of content to begin with. Based on the properties, values, and ratings assigned to the profile, and any dependencies specified for a given layer of the hierarchy of information items, the database of potential information items is queried and suitable candidates are selected. At the communication unit and/or interchangeable part level, this operation may be parameterized to provide an easy architecture for satisfying gateway requirements for legacy storage retrieval. Pointers to the actual objects are all that is retrieved. The output of this operation is the input for Exclusion.

Exclusion

Based on the Properties, values and ratings assigned to the profile, and any dependencies specified for a given layer of the hierarchy of information items, the selected information items are filtered to exclude unsuitable candidates. An unsuitable information item is one where there is no match between the property-value combinations assigned to the information item and those assigned to the profile or if there is a match, where the property-value combination in the information item has the NEVER rating. The output of this operation is the input for Competition.

Competition

Based on the property-value combinations and their ratings and validities that are assigned to the information item and to the profile and on any dependencies specified for a given organization layer, the information items remaining after exclusion are scored and ranked accordingly. The scoring is accomplished by a scoring function that implements the decision strategy that has been selected for producing this output 221. Further processing by the Competition operation includes trimming the information items of a given layer to specified size, if such a constraint exists.

The decision to include, exclude or settle between contenders, effectively happens from the bottom upward. First, each communication unit effectively chooses its best combination of interchangeable parts in the context of the recipient profile and prescribed scoring function, then the section chooses its best communication units, then the structural template uses its best sections. In this way, the most appropriate versions of communication units are used to populate the most advantageous version of sections, which were used to populate the structural template. If there are competing structural templates, the process goes higher.

Sequencing

In a section containing multiple communication Units, the order of presentation must be determined. The sequencing function accomplishes this. It may be as trivial as an order by descending score or more complex.

Scoring

The key to ongoing development of system 201 is interchangeable scorers 217 for different decision strategies. In a presently-preferred embodiment, a only single simple scorer is employed. The scorer in the preferred embodiment operates as follows: Using the recipient profile to determine which properties, values, and ratings are important for determining the scores of the information items, the scorer 217 computes scores for any variable parts in the information object being scored. The most trivial scoring computation would be to simply add up the ratings for all property-value combinations and let the highest-scoring information item at a given level of the hierarchy win. Initially the ratings are limited to HIGH, MEDIUM, LOW, and NEVER. These ratings can be mapped to integers. Sums or averages over the property-value combinations of interest can be employed with slightly different results. More detailed play-acting, work-flow analysis, and Alpha user interviews can be used for ethnographic analysis to determine requirements for more sophisticated scoring operations.

FIG. 15 provides an example of the manner in which the simple scorer 217 employed in a presently-preferred embodiment operates. The recipient profile against which scorer 217 is scoring information items is shown at 1501; there are four property-value combinations that are of interest: Audience:Executive, Geography:Latin America, Needs:Remote Access, and Needs:Easy Configuration. All of these but the last have a "high" rating.

The personalized output 221 for which scorer 217 -will chose among interchangeable parts is a presentation slide for which interchangeable parts are selected from two interchangeable part groups: interchangeable part group 1503 is the interchangeable parts from which the slide's heading is selected; interchangeable part group 1511 is the interchangeable parts from which a bulleted list item in the slide is selected. A single fixed-length part will be selected from each of the two groups.

There are three interchangeable parts in group 1503. The table shows for each interchangeable part its number in the group, the property-value combination it is intended for, and its rating. Thus, in row 1505, it may be seen that part #1 is for the Audience:Executive property-value combination and has a high rating. In order to provide for computation by scorer 217, the ratings have been mapped to integers: 40 to the HIGH rating, 30 to the MEDIUM rating, 20 to the LOW rating, and 10 to the NEVER rating. In group 1503, the only interchangeable part that matches recipient profile 1501 is part #1, which has a rating of 40, so that part will be selected by output assembler 219.

The situation is more complex with regard to the parts in interchangeable parts group 1511; there are six such groups and all of them contain at least one property-value combination that is present in profile 1501. The Total column of the table shows the total score for each interchangeable part. When a property-value combination assigned to the interchangeable part matches a property-value combination in the profile, scorer 217 computes the score from the rating for the matching combination. If the property-value combination for the profile and the interchangeable part are the same but the rating is not the same, the ratings are averaged. f there is more than one match for an interchangeable part, the scores are added. Thus, in interchangeable part 4 in table 1511 (entry 1519), there are two matches; the rating for each match is HIGH, and so the total score for interchangeable part 4 is 80. The Sequence column of the table shows the order assigned to the interchangeable parts. If the scoring of the interchangeable parts results in a tie, as it does here between entries 1519 and 1521, the sequence decides which of the tied interchangeable parts is used by assembler 219. In this case, it is the interchangeable part of entry 1519.

Graphical User Interface for System 201

Property managers view and manipulate the information in database 223 by means of property management graphical user interface (GUI) 207. GUIs are well-known in the art, and the construction of displays for data in GUIs are also well-known in the art. In the following, therefore, only the displays themselves will be shown and described. In a preferred embodiment, GUI 207 is implemented using the GUI provided by the Microsoft® Windows operating systems produced by Microsoft Corporation.

Figure 8:
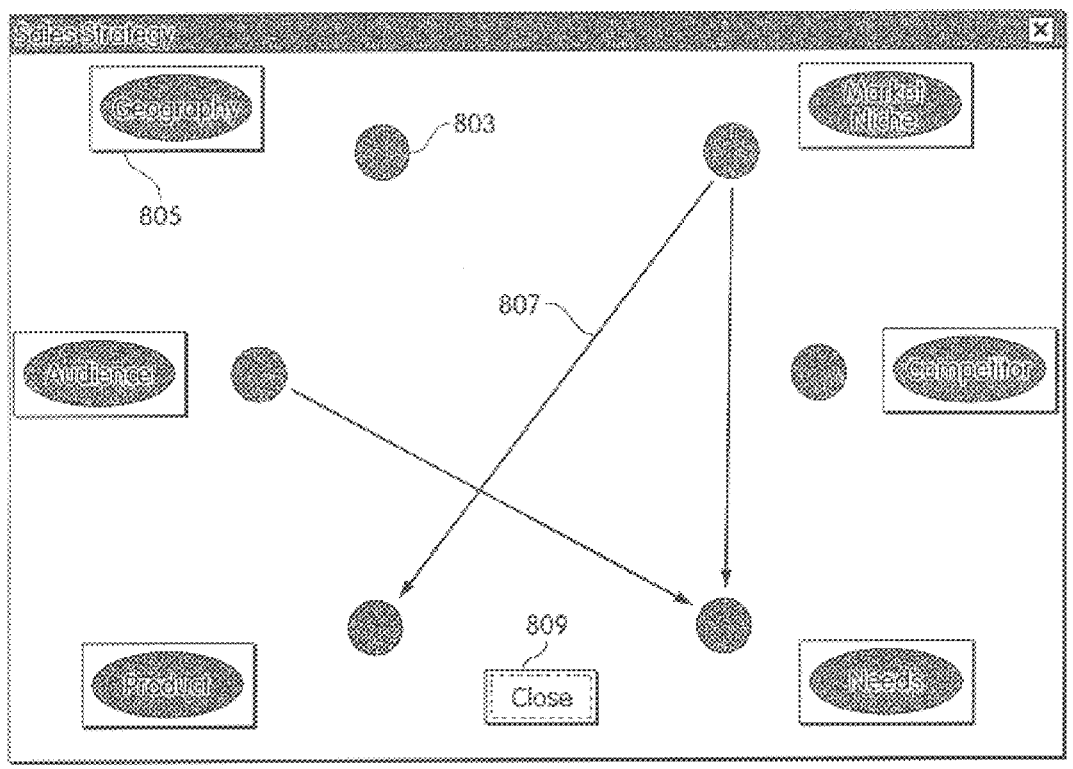
FIG. 8 is a window that displays information about properties and relationships belonging to a strategy.
Figure 9:
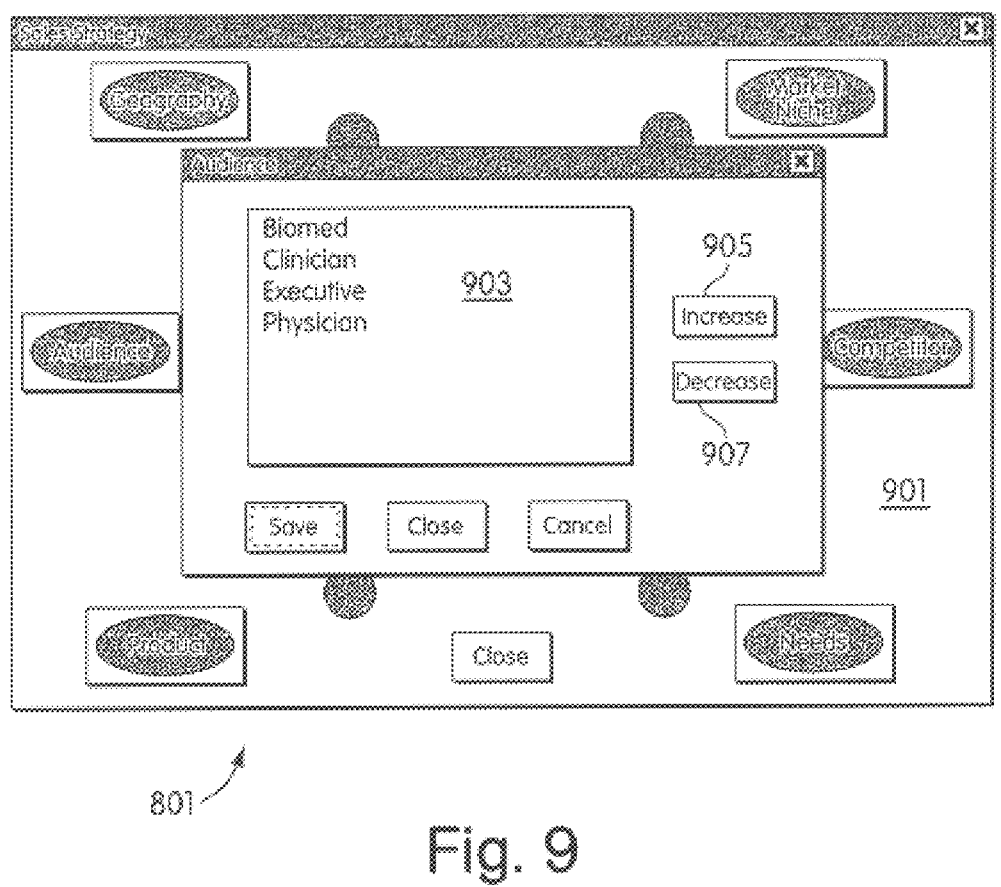
FIG. 9 is a window that displays information about values in a property.
Figure 10:
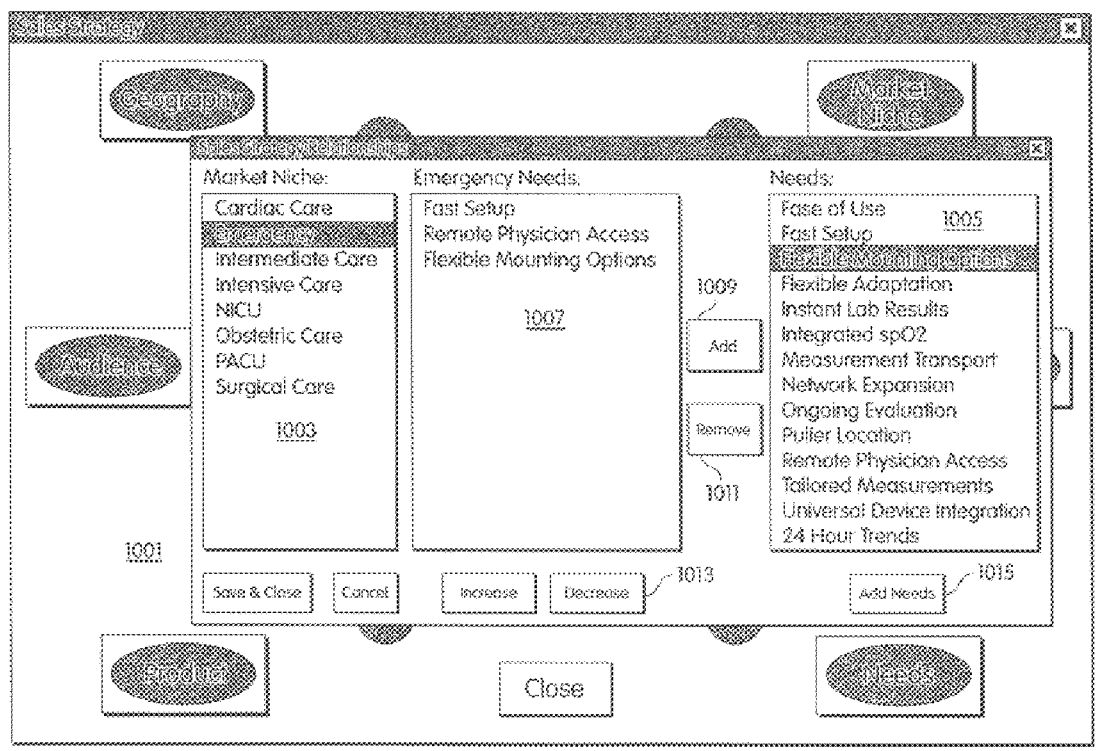
FIG. 10 is a window that permits relating a value in the origin property of a relationship to one or more values in the relationship's destination property.

Graphical User Interface for Strategies, Properties, Values, and Relationships: FIGS. 8–10

FIG. 8 shows window 801 used to display the properties belonging to a strategy. The information displayed in this and the following windows comes from the strategy and property definitions of FIG. 3 and changes to the definitions of FIG. 3 are made using the windows. Window 801 is for a strategy named Sales; the properties in the strategy include Geography, Market Niche, Audience, Competition, Product, and Needs. Each strategy is indicated by a colored circle 803 and has a button 805; selecting the button for a property causes details about the property to be displayed. Clicking on the colored circle causes arrows 807 to appear that show relationships between the property and the other properties in the strategy. The relationships are of course specified by relationship definitions 307. The arrow points from the origin property to the destination property.

FIG. 9 shows the window 901 that is displayed on top of window 801 when the button for the Audience property is clicked on. Subwindow 903 permits the property manager to view and manipulate the values belonging to the Audience property. Here, what is being sold is medical instruments, so the property manager who designed the Sales strategy has defined four different kinds of audiences: a biomedical research audience, a clinician audience, a medical executive audience, and a physician audience. New values may be defined for a property and existing ones removed using this screen. A value may be selected and buttons 905 and 907 may be used to increase or decrease the priority of the selected value relative to the other values. The window used to define a strategy is similar to window 901, except that the names in the subwindow are the names of properties and there are no buttons 905 and 907.

FIG. 10 shows the window 1001 used in a preferred embodiment to manipulate relationships between properties. This window permits the property manager to modify the information in relationship definitions 307. To reach the window from window 1001, the property manager clicks on the arrow 807 connecting the property Market Niche and the property Needs. Window 1001 has three subwindows: subwindow 1003 shows the values belonging to the origin property in the relationship, Market Niche; subwindow 1005 shows the values belonging to the destination property, Needs. As mentioned in the discussion of relationship definitions 307, a relationship relates one or more values of the origin property to a value of the destination property. Screen 107 shows the relationship named Emergency Needs. This relationship relates the value Emergency of Market Niche to the values Fast Setup, Remote Physician Access, and Flexible Mounting Options of Needs. To add a value of Needs to Emergency Needs, the property manager highlights the value in window 1005 and clicks on button 1009; to remove a value, the property manager highlights the value in subwindow 1007 and clicks on button 1011. To add values to Needs, the property manager uses butt on 1015. The Increase and Decrease buttons at 1013 are used to increase or decrease the value-level priority of the values of the destination property that relate to the origin property. The window for defining new relationships is similar to window 1001.

Figure 11:
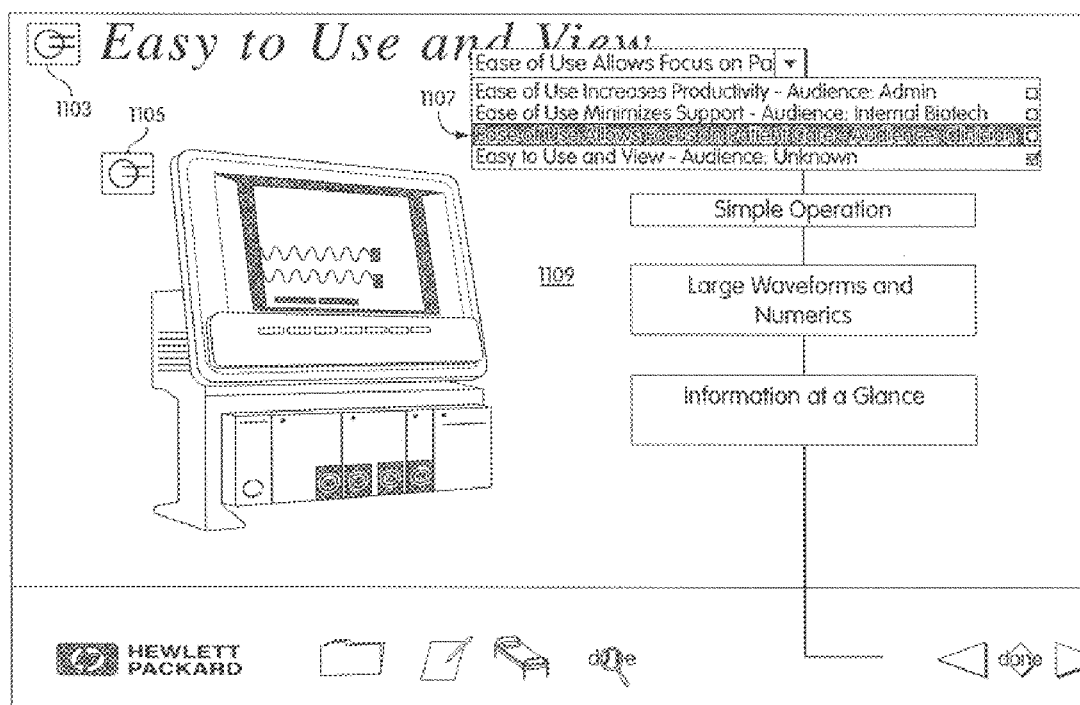
FIG. 11 is a window that shows assignments of properties to interchangeable parts.

Assigning Values to Information Items: FIG. 11

FIG. 11 shows the graphical user interface for examining the property and value assigned to an information item. Window 1001 is a slide from a slide presentation that is produced by system 201. The slide is a communications unit that uses interchangeable parts from two interchangeable part groups. When system 201 displays the slide, it includes a button for each of the components of the slide that is an interchangeable part. In the slide of window 1101, one such component is the slide title, which is controlled by button 1103; the other is picture and description 1109, which is controlled by button 1105. When button 1103 is selected, drop-down list 1107 appears, which lists the interchangeable parts belonging to the interchangeable parts group for the title and the property-value combination that has been assigned to each of the interchangeable parts. Thus, the interchangeable part Ease of Use Increases Productivity has been assigned the property-value combination Audience:Admin, and if the property-value combination in the profile which determines the form of the slide presentation is also Audience:Admin, the title for the slide will be Ease of Use Increases Productivity; if the profile specifies the property-value combination Audience:Unknown on the other hand, the title will be Easy to Use and View, and so on for the other property-value combinations. If the profile does not specify a property-value combination, the default interchangeable part, which is indicated by the checked check box will be used. In this case, the default is Easy to Use and View. If button 1105 is selected, a similar list of interchangeable parts and the property-value combinations assigned to them will appear for the picture and the bullet list next to it. These property-value combinations may of course be completely different from those assigned to the headline interchangeable parts.

Figure 16:
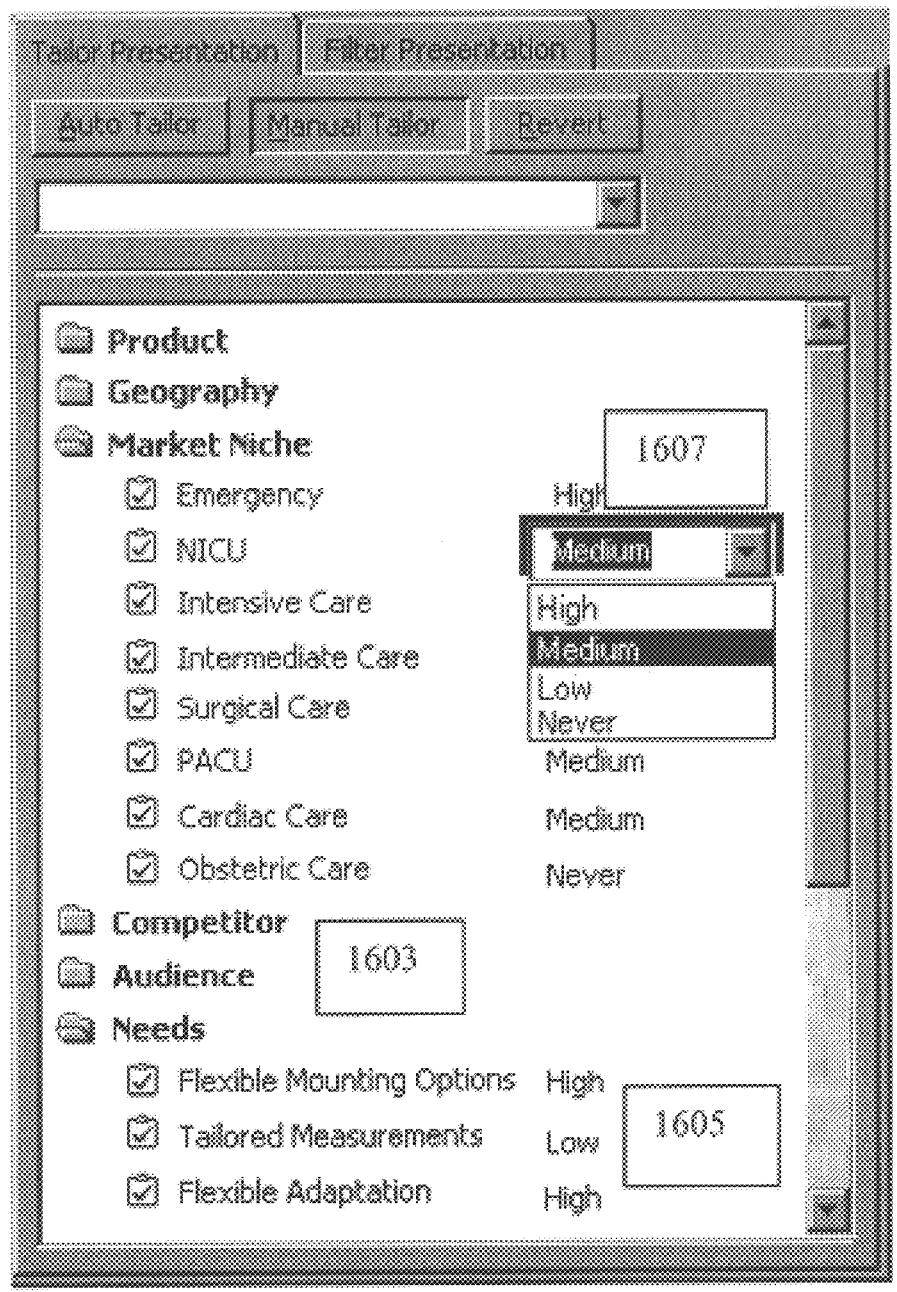
FIG. 16 is a screen for manually assigning property-value combinations to information items.

Manual Assignment of Property-value Combinations to Information Items: FIG. 16

To assign an additional property-value combination to one of the interchangeable parts shown at 1107, the property manager double clicks on the interchangeable part. Window 1601 shown in FIG. 16 then appears which lists at 1603 all of the property-value combinations in the strategy. A check box next to the combination indicates whether it has been assigned to the interchangeable part; if not, assignment is done by checking the check box; if an assignment is to be removed, the check is removed from the box. Also included in this window is the rating for each assignment (1605). To set the rating for an assignment, one uses drop-down box 1607. On selection of a checked combination, the current rating for the combination is displayed; on checking of an unchecked combination, the user selects the desired rating from the drop-down menu.

Figure 12:
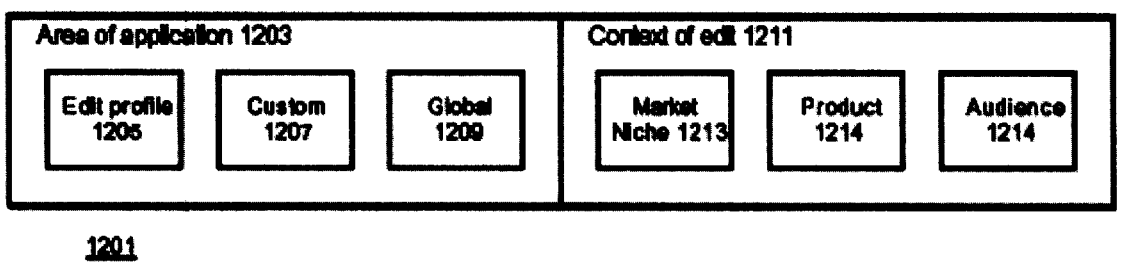
FIG. 12 is a diagram of a toolbar used for assignment of properties while editing.

Automatic Assignment of Property-value Combinations to Information Items: FIG. 12

In a preferred embodiment, automatic assignment of property-value combinations is also possible. This is done as follows: before beginning to edit a presentation so that it will work better with a given class of recipients, the property manager makes an editing profile indicating the property-value combinations that describe the class of recipients for which the edit is intended. Typically, only a few of the property-value combinations for the strategy are important for the edit. The window for doing this (not shown) is similar to the window for making a profile for producing a presentation, which will be shown later.

When the property manager begins editing the presentation, the editor includes the toolbar shown in FIG. 12. Toolbar 1201 has two sets of buttons: one set, indicated by the label Area of application 1203 permits the property manager to indicate whether the editing currently being done applies only to the edit profile (button 1205), applies to this version of the presentation only (button 1207), or applies to all versions of the presentation (button 1209). When an area of application button is selected, it stays on until it is selected again, and all editing done while the button is on applies to the area of application specified by the button. The other set, labeled context of edit 1211 indicates which of the property-value combinations specified in the edit profile should be assigned to the edit. There is a button in part 1211 of the toolbar for each property-value combination specified in the editing profile. These buttons work like the area of applications button: once selected, they stay selected until they are turned off, and everything edited while a given button is on is assigned as indicated by the button. For example at the interchangeable part group level, if the property manager changes the title on a given slide, the new title is added as an information item with the ratings set as indicated the toolbar when the edit was made. Or for example, if the property manager moves a slide to a later point in the presentation, the rating will be set lower for that information item's property-value combination. In response to the buttons, the editor tags the edit to indicate whether the edit is global, or custom, or made for the edit profile. When the property manager finishes the editing session, global changes are applied to all versions of the presentation, custom changes are applied only to this version, and information items with changes made for the edit profile have the property-value pair specified for the change assigned to them.

To make it easier to incorporate pre-existing material into information items 235, system 201 in a preferred embodiment includes parsers which read pre-existing material and determine from its structure which parts of the material are interchangeable parts, which are content units, and so forth. These parsers take advantage of the close relationship between the kinds of information items and structures in presentations. For instance, in a slide presentation, the individual slide is always an information unit and its subdivisions are interchangeable part groups with at least one interchangeable part. Once the parser has subdivided the pre-existing material, property-value combinations can be assigned to the information units by hand as described above or even automatically. In the latter case, the property manager would specify property-value combinations in an editing profile as described above and system 201 would assign all of the specified property-value combinations to all of the information items found by the parser.

Better-quality automatic property-value assignment might be obtained by using text analysis techniques. For instance, information items 235 could be examined for text that resembled the text of a new information item located by the parser and the new information item could receive any property-value assignment for the similar text that was indicated in the editing profile. Where value assignment is being done by hand, the property-value assignments thus obtained could be provided as suggestions to the property manager doing the manual assignment.

Graphical User Interface for Making Profiles: FIG. 13

FIG. 13 shows a graphical user interface used in a preferred embodiment for defining recipient profiles. The interfaces for making editing profiles for automating the assignment of property-value pairs to edited material and for making analysis profiles for analyzing the information contained in database 223 are substantially similar. Since the profile being made using window 1301 in FIG. 13 is for a presentation to be made to a recipient, the property manager inputs or selects the name of the recipient at 1305 and specifies the length of the presentation at 1309. The length specification is used by output assembler 219 to determine how many of the rank-ordered content units to incorporate into the presentation. To facilitate cutting of a presentation, information items can be defined as fixed, so that the basic structure of the presentation is preserved while the cutting is done. Within this basic structure, cutting is done within sections.

The remainder of window 1301 permits the property manager to specify property-value combinations from the strategy that are relevant to the presentation and assign them to the recipient profile. The recipient profile may also be automatically constructed from information in a Contact Management Database or from recipient feedback, as previously described. If there are more properties in the strategy than can fit on a single window, a sequence of windows like window 1301 are used to define the strategy. In window 1301, the property manager uses list 1307 to select a value for the Market Niche property, area 1311 to select one or more values for the Audience property, and area 1313 to select one or more values for the Product property. As is apparent from window 1301, it is thus possible to define a profile for a presentation that involves more than one product and is directed to more than one audience. To move back and forth in the sequence of windows for the strategy, the property manager uses the back and next buttons; when the property manager has added all of the property-value combinations to the profile that appear relevant to the presentation's audience, the property manager clicks on the finish button; System 201 then makes profile assignments 311 with the selected property-value combinations for the recipient.

Figure 14:
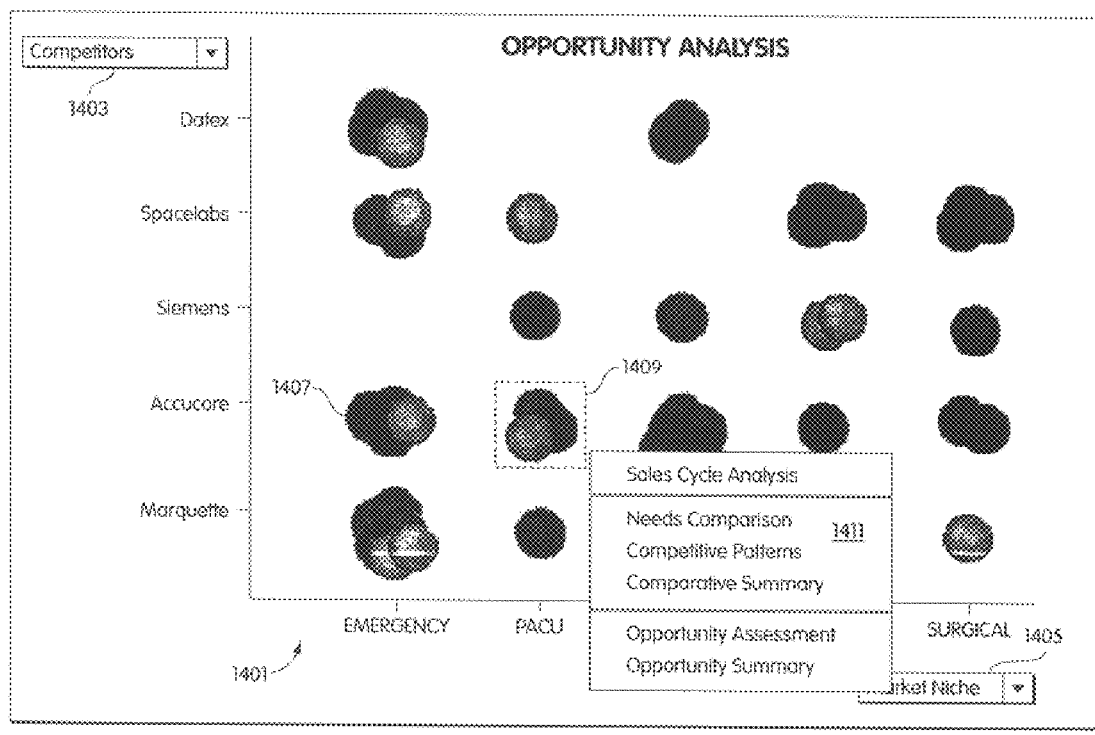
FIG. 14 is a screen showing a first kind of analysis done using feedback units.

Graphical User Interface for Feedback-based Analysis: FIG. 14

FIG. 14 provides an example of the kind of analysis that can be done using feedback. What is displayed depends of course on the program that is reading the feedback. Window 1401 shows an opportunity analysis, that is, it shows for each competitor/market niche pair how often the competitor was met and the strength of the competition. The vertical axis is the values of the Competitor property; the horizontal access is the values of the Market Niche property; at the intersection in the graph for a given competitor/market niche pair, each colored ball stands for a sales opportunity in the market niche where the competitor was involved. The color of the ball indicates the quality of the opportunity, with yellow indicating a won opportunity, red an opportunity in progress, and blue a lost opportunity. Thus, the balls labeled 1407 indicate that in the Emergency market niche, Accucore was encountered in four sales opportunities, one of the opportunities was won, and the rest were lost. As shown at 1409, a group of balls may be selected, and when that is done, menu 1411 appears, which offers further possibilities for analysis involving the competitors, the opportunities, and the market niches.

The information for window 1401 is received via feedback. In this case, the feedback is collected from salespeople after they have dealt with the sales opportunity. Three properties are involved in the feedback: Competitors, Market Niche, and a property Sales Opportunity that has three values: Won, In progress, and Lost. The salesperson reports periodically on sales opportunities using system 201. Among other things, the system asks the salesperson who the competitors were that he or she encountered, what the market niche was, and what the status of the opportunity is. In each case, the salesperson answers by choosing among the values of the Competitors, Market Niche, and Sales Opportunity properties. Feedback units are made as described above from the questions, with the value-property pairs received in the answer to the question being assigned to the feedback unit to the question. Periodically, perhaps once a quarter, the feedback units are read by system 201 and the information contained in them is used to make window 1401.

Conclusion

The foregoing Detailed Description has disclosed the best mode presently known to the inventors of implementing a system for evaluating items of information in which a set of properties and values is defined, properties and values are assigned to profiles and information items, and the information items are evaluated by scoring the match between the profile and the information items. As indicated above, such a system may be used for constructing personalized output or analyzing the information items it contains, including feedback from recipients of the personalized output.

It will be immediately apparent to those skilled in the arts to which the inventions disclosed herein apply that the principles of the disclosed inventions may be implemented in many ways other than those disclosed herein for the preferred embodiment and that the inventions may be used for purposes other than those disclosed herein. For all of these reasons, the Detailed Description is to be regarded as being in all respects exemplary and not restrictive, and the breadth of the invention disclosed here in is to be determined not from the Detailed Description, but rather from the claims as interpreted with the full breadth permitted by the patent laws.

What is claimed is:

1. Apparatus for evaluating items of information comprising:
    evaluation value definitions that define a plurality of evaluation values;
    relationship definitions that define relationships between evaluation values, a relationship relating a first evaluation value to a second evaluation value;
    a profile;
    an assigner that assigns one or more of the evaluation values to an item of information or a profile and, when the assigned evaluation value is a first evaluation value in a relationship, assigns the second evaluation value in the relationship to the item of information or profile;
    an evaluator which evaluates an item of information in terms of a match between the evaluation values assigned to the profile and the evaluation values assigned to the item of information and;
    wherein the relationship definition includes a validity, the validity representing an assessment of a correctness of an assignment; and
    the assignment for the second evaluation value has the validity defined for the relationship.

2. Apparatus for evaluating items of information comprising:
    evaluation value definitions that define a plurality of evaluation values;
    relationship definitions that define relationships between evaluation values, a relationship relating a first evaluation value to a second evaluation value;
    a profile;
    an assigner that assigns one or more of the evaluation values to an item of information or a profile and, when the assigned evaluation value is a first evaluation value in a relationship, assigns the second evaluation value in the relationship to the item of information or profile;
    an evaluator which evaluates an item of information in terms of a match between the evaluation values assigned to the profile and the evaluation values assigned to the item of information and;
    wherein the relationship definition includes a priority, the priority representing a priority of a relationship defined in the relationship definition relative to other relationships of the first evaluation value; and
    the priority determines which second evaluation value is assigned to the item or information profile.

3. Apparatus for evaluating items of information comprising:
    evaluation value definitions that define a plurality of evaluation values;
    relationship definitions that define relationships between evaluation values, a relationship relating a first evaluation value to a second evaluation value;
    a profile;
    an assigner that assigns one or more of the evaluation values to an item of information or a profile and, when the assigned evaluation value is a first evaluation value in a relationship, assigns the second evaluation value in the relationship to the item of information or profile;
    an evaluator which evaluates an item of information in terms of a match between the evaluation values assigned to the profile and the evaluation values assigned to the item of information and;
    wherein an evaluation value is a property-value combination and an evaluation value definition defines a property and one or more values belonging to the property;
    where there is more than one value belonging to the property, the evaluation value definition may define priorities among the values; and the evaluator further evaluates the item of information in terms of the priorities.

4. Apparatus for evaluating items of information comprising:

evaluation value definitions that define a plurality of evaluation values;

relationship definitions that define relationships between evaluation values, a relationship relating a first evaluation value to a second evaluation value;

a profile;

an assigner that assigns one or more of the evaluation values to an item of information or a profile and, when the assigned evaluation value is a first evaluation value in a relationship, assigns the second evaluation value in the relationship to the item of information or profile;

an evaluator which evaluates an item of information in terms of a match between the evaluation values assigned to the profile and the evaluation values assigned to the item of information and;

wherein the items of information are organized in a hierarchy in which an item of information at a higher level of the hierarchy specifies an item of information at a lower level thereof, the specified item being specified on the basis of the evaluator's evaluation thereof; and the apparatus further includes an output assembler that assembles an output from the items of information according to an information item at a higher level of the hierarchy and;

wherein the hierarchy of items of information includes communication unit information items and structure template information items that are higher in the hierarchy than the communication unit information items; and the output assembler assembles the output in accordance with a structure template information item.

5. The apparatus set forth in claim 4 wherein:

a structure template information item specifies a sequence of communication unit information items.

6. The apparatus set forth in claim 5 wherein:

the communication unit information items specify slides for use in a slide presentation and the output is the slide presentation.

7. The apparatus set forth in claim 5 wherein:

the communication unit information items specify Web pages and the output is a sequence of the Web pages.

8. The apparatus set forth in claim 5 wherein:

the communication unit information items specify small sections of a document and the output is the document.

9. The apparatus set forth in claim 4 wherein:

the items of information further include interchangeable part information items that are lower in the hierarchy than the communication unit information items, a communication unit item specifying one or more interchangeable part information items.

10. Apparatus for producing a customized output from items of information comprising:

one or more profiles;

evaluation values associated with the profiles and the items of information;

an evaluator which evaluates an item of information in terms of the evaluation values associated with a given profile and the evaluation values associated with the item of information;

an output assembler that assembles an output from the items of information, the items of information being hierarchically organized such that an item of information which is higher in the hierarchy specifies one or more items of information which are lower in the hierarchy, the specified items being specified on the basis of the evaluator's evaluation of the specified items and the output assembler assembling the output according to an item of information at a higher level of the hierarchy, and wherein the items of information include communication unit information items and structure template information items, a structure template information item specifying a sequence of the communication unit information items.

* * * * *